Oct. 13, 1970    J. C. HOUDA, JR., ET AL    3,534,248
ELECTRICAL NETWORK HAVING COMPONENTS DISPOSED INSIDE
AND ABOUT A TUBE AND METHOD OF MAKING IT
Filed Feb. 19, 1968
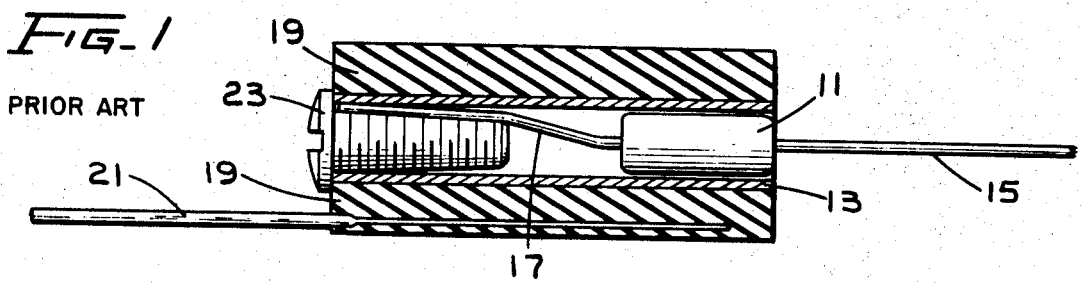
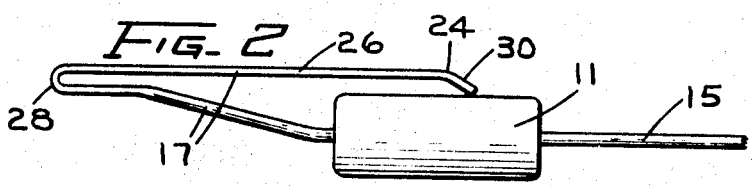
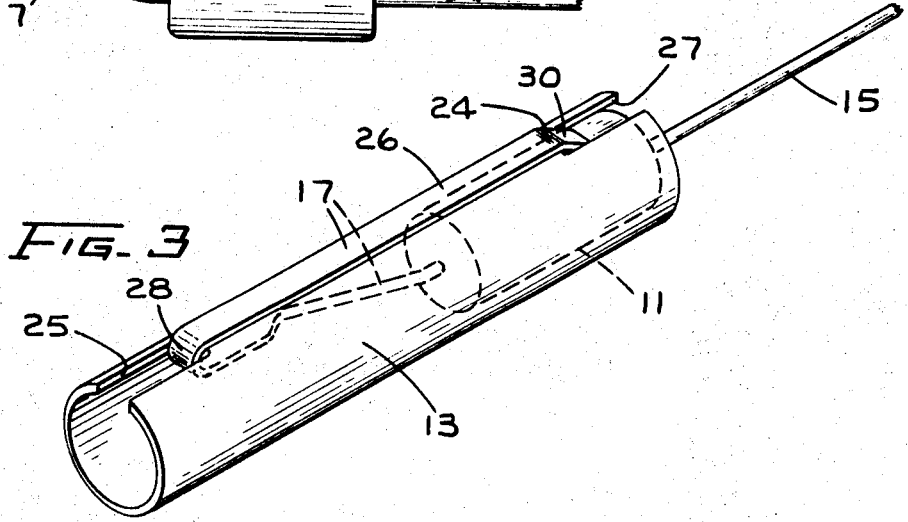
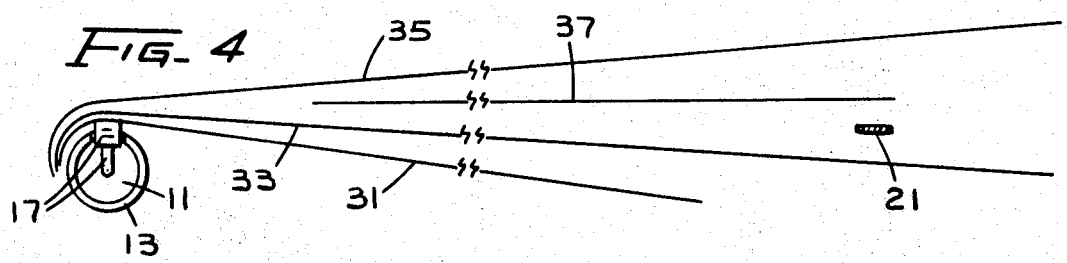
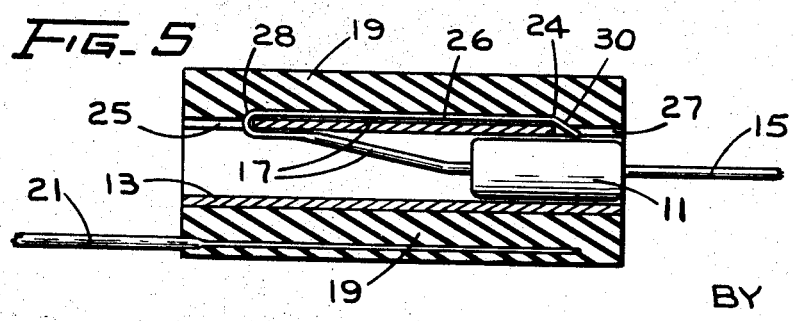
INVENTORS
J.C. HOUDA, Jr.
B.R. KASIK
R.L. SCHUH
BY *W. Dossé*
ATTORNEY

3,534,248
ELECTRICAL NETWORK HAVING COMPONENTS DISPOSED INSIDE AND ABOUT A TUBE AND METHOD OF MAKING IT

James C. Houda, Jr., Downers Grove, Bernard R. Kasik, Skokie, and Roger L. Schuh, Naperville, Ill., assignors to Western Electric Company, Incorporated, New York, N.Y.
Filed Feb. 19, 1968, Ser. No. 706,576
Int. Cl. H01g 3/07
U.S. Cl. 323—74          14 Claims

ABSTRACT OF THE DISCLOSURE

To make a series, resistance-capacitance network, one of the leads of an axial-lead resistor is flattened and folded back over the resistor body. The resistor body is inserted into an aluminum tube with the flattened resistor lead dressed along the outside of the tube. A foil capacitor is wound around the tube with one foil electrode making an electrical connection with the flattened resistor lead and with the aluminum tube. A terminal lead is connected to the other foil electrode to complete the series, resistance-capacitance network.

BACKGROUND OF THE INVENTION

Field of the invention

This invention relates to electrical components and more particularly to a unitary structure comprising a capacitance and another electrical parameter and to methods of making the same.

Description of the prior art

Electrical networks which require the series connection of a resistor and a capacitor can easily be assembled in a conventional manner from the separate components. However, when large numbers of identical networks are needed, this form of assembly is very expensive and is often too bulky for modern electronic circuits. It has long been known that such networks could be assembled into unitary structures to reduce their cost, bulk, and weight; but problems often arise in making the interconnections of the several parts of the network and assuring the reliability of these interconnections. These interconnections also often add unnecessarily to the cost, bulk, and weight of the networks.

Therefore, it is an object of the present invention to make a lightweight, compact electrical network cheaply and easily.

It is another object of the present invention to provide an electrical network having a minimum of parts.

SUMMARY OF THE INVENTION

In accordance with the present invention an electrical network is made by forming one lead of an electrical component over the outside of a tube into which the electrical component is positioned. A capacitor is then formed about the outside of the tube with one electrode of the capacitor making an electrical connection with the one lead of the electrical component.

BRIEF DESCRIPTION OF THE DRAWINGS

Other objects, advantages and novel aspects of the invention will become apparent upon consideration of the following detailed description in conjunction with the accompanying drawing, wherein the same reference numbers are used to designate similar parts throughout the several views, in which:

FIG. 1 is a cross-sectional view of a resistance-capacitance network constructed according to prior-art techniques;

FIG. 2 is a view, in perspective, of a carbon resistor with one axial lead formed for use in the present invention;

FIG. 3 shows how the resistor of FIG. 2 is positioned inside a metal tube around which a capacitor is wound;

FIG. 4 is a developed illustration of the metallic foil electrodes and dielectric films from which the capacitor is made; and FIG. 5 is a cross-sectional view of a resistance-capacitance network constructed in accordance with the present invention.

DETAILED DESCRIPTION

Referring now to the drawings and more particularly to FIG. 1 which shows a resistance-capacitance network manufactured according to the prior art, a resistor 11 is inserted within an aluminum tube 13 with one axial lead 15 of the resistor extending out one end of the tube and the other axial lead 17 dressed along the inside surface of the tube 13. A capacitor 19 comprising two electrically-conductive aluminum-foil electrodes separated by two dielectric films is wound around the outside of the tube 13 with one of the metallic electrodes making an electrical connection to the outside surface of the electrically-conductive aluminum tube 13. A lead 21 makes electrical contact with the other foil electrode of the capacitor 19, thereby forming a capacitive coupling between the lead 21 and the tube 13. Therefore, since the resistor 11 makes an electrical resistive connection between its one axial lead 15 and the tube 13, a series, resistance-capacitance network exists between the two leads 15 and 21. A screw 23 is threaded into the end of the tube 13 opposite from the one lead 15 and forces the other lead 17 of the resistor 11 into intimate mechanical and electrical contact with the inside surface of the tube 13.

In order to simplify the manufacture of series RC network circuits, the normally-round lead 17 of the resistor 11 is flattened slightly over approximately the outer three quarters of its length and is folded back to at least partially overlap the body of the resistor 11. A small bend 24 is made in the lead 17 near its outer end which is thus formed to project the end of the lead 17 toward and preferably to touch the body of the resistor. The lead 17 is also bent to assume a shape generally as shown in FIG. 2. The carbon resistor 11 has a generally cylindrical shape and is inserted into the cylindrical aluminum tube 13 having an inside diameter substantially the same as the outside diameter of the resistor 11. As shown in FIG. 3, the folded portion of the lead 17 is dressed along the outside surface of the aluminum tube 13. Two notches 25 and 27 are formed in the ends of the tube 13, and the small bend 24 near the end of the lead 17 is positioned near the root of the notch 27. The length of the flattened, folded portion 26 of the lead 17 is chosen such that the principal fold 28 in the flattened portion of the lead 17 is positioned near the root of the notch 25. Therefore, the notches 25 and 27 confine the lead 17 to prevent relative rotation and axial movement between the resistor 11 and the tube 13. The small portion 30 of the lead 17 that extends between the bend 24 and the end of the lead 17 cooperates with the root of the notch 27 to form a yieldable lock which holds the resistor 11 within the tube 13 and prevents it from sliding out of the tube.

The composite structure of FIG. 3 comprising the resistor 11 within the tube 13 forms the base upon which a capacitor is wound as shown in FIG. 4 with one metallic foil electrode 31 making intimate electrical contact with the outside surface of the tube 13 and with the folded portion 26 of the lead 17. Two dielectric films 33 and 35 are wrapped with the foil electrode 31 for several turns to assure that when a second metallic foil electrode 37 is subsequently wrapped with the dielectric films 33 and 35 and with the foil electrode 31, a dielectric, capacitive coupling exists between the foil electrode 31 and the foil electrode 37 through the two dielectric films 33 and 35 with no short circuits between the foils 31 and 37.

After a sufficient amount of cooperating electrode area capacitively linking the two foil electrodes has been wound about the tube 13, the foil electrode 31 is terminated. A lead 21 is then placed in contact with the foil electrode 37, and several additional turns of dielectric film are wrapped around the structure to hold the lead 21 in place.

FIG. 5 shows a cross-sectional view of a resistance-capacitance network made according to the steps illustrated in FIGS. 2, 3, and 4, having the resistor 11 positioned within the metallic tube 13 with one lead 17 of the resistor formed and dressed along the outside surface of the tube 13 and with a capacitor 19 formed about the outside of the tube 13. One of the foil electrodes of the capacitor makes an electrical connection to the lead 17 of the resistor without the need for the screw 23 (FIG. 1) to assure electrical contact between the lead 17 and the capacitor 19.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An electrical network comprising:
    a first electrical component having at least one lead of relatively rigid construction extending therefrom;
    a tube, said first electrical component being positioned inside of said tube with the relatively rigid lead of said first electrical component being bent and having a portion thereof dressed along the outside of said tube; and
    a second electrical component formed about said tube and a dressed portion of the relatively rigid lead of said first electrical component such that an electrode of said second electrical component makes an electrical connection with the dressed portion of the lead.

2. An electrical network according to claim 1 wherein said second electrical component is a capacitor which comprises:
    one electrically-conductive strip wound about said tube and a dressed portion of the relatively rigid lead of said first electrical component so as to make an electrical connection with the dressed portion of the lead;
    a second electrically-conductive strip juxtaposed in overlapping relation to said one electrically-conductive strip and wound about said tube but being isolated from direct electrical connection with the lead of said first electrical component; and
    at least one dielectric film preventing direct physical contact between said one electrically-conductive strip and said second electrically-conductive strip.

3. An electrical network comprising:
    an electrical component having a lead extending from one end of a body of said electrical component, said lead being flattened and formed parallel with and folded to overlap at least a portion of the body of said electrical component;
    a tube having an inside contour substantially the same size and shape as said electrical component, said electrical component being positioned inside of said tube with a portion of the lead of said electrical component being dressed along the outside of said tube; and
    a capacitor formed about said tube and a dressed portion of the lead of said electrical component such that one electrode of said capacitor makes an electrical connection with the dressed portion of the lead.

4. An electrical network according to claim 3 wherein a portion of said tube separates said electrical component from that portion of its dressed lead that is flattened and formed parallel with and folded to overlap at least a portion of the body of said electrical component.

5. An electrical network comprising:
    an electrical component having at least one lead extending from one end thereof;
    a tube having an inside contour substantially the same size and shape as said electrical component and having at least one notch extending longitudinally from one end thereof and occupying at least part of the surface of the end of said tube, said electrical component being positioned inside of said tube with a portion of the lead of said electrical component located in the notch in said tube to prevent relative rotation between said electrical component and said tube, and with a portion of the lead of said electrical component being dressed along the outside of said tube; and
    a capacitor formed about said tube and a dressed portion of the lead of said electrical component such that one electrode of said capacitor makes an electrical connection with the dressed portion of the lead.

6. An electrical network according to claim 5 wherein:
    the end of the lead of said electrical component is bent to direct the end of the lead generally toward the body of said electrical component;
    said tube contains another notch aligned with the one notch but extending from the other end of said tube; and
    the bent portion of the lead of said electrical component is positioned within the other notch of said tube, thereby impeding removal of said electrical component from said tube.

7. An electrical network which comprises:
    a tube having at least one opening in a wall thereof;
    a first electrical component positioned inside of said tube and having a lead which extends through the opening in the wall of said tube to prevent relative rotation between said first electrical component and said tube and which has a portion thereof dressed along the outside of said tube; and
    a second electrical component formed about said tube and a dressed portion of the lead of said first electrical component such that an electrode of said second electrical component makes an electrical connection with the dressed portion of the lead.

8. An electrical network as recited in claim 7, in which:
    the opening in the wall of said tube is an open-ended notch at one end of said tube.

9. An electrical network as recited in claim 7, in which:
    portions of the lead of said first electrical component at opposite ends of the portion of the lead which is dressed along the outside of said tube are disposed in openings in the wall of said tube to prevent relative rotation between said first electrical component and said tube and to impede removal of said first electrical component from said tube.

10. An electrical network as recited in claim 9, in which:
    the lead of said first electrical component is of relatively rigid construction and is formed with a reverse bend, with the portions of the lead which are reverse-bent and which are disposed in the openings in the wall of said tube and dressed along the outside of said tube having a flattened configuration.

11. The method of making an electrical network of the type in which a first electrical component having a relatively rigid lead is received in a tube and a second electrical component is formed about the tube, which comprises:
    inserting the first electrical component into the tube:
    dressing a portion of the relatively rigid lead of the first electrical component along the outside of the tube; and forming the second electrical component around the tube and a dressed portion of the lead of the first electrical component such that an electrode of the second electrical component makes an electrical connection with the dressed portion of the lead.

12. The method of making an electrical network as recited in claim 11, which further comprises:

preforming the lead of the first electrical component so that a portion of the lead will extend substantially parallel to a wall of the tube as the first electrical component is inserted into the tube; and then simultaneously inserting the first electrical component into the tube and dressing a portion of the lead of the first electrical component along the outside of the tube.

13. The method of making an electrical network of the type in which an electrical component having a lead is received in a tube and a capacitor is wound about the tube, which comprises:

forming the lead of the electrical component parallel with and extending over the body of the electrical component;

then simultaneously inserting the electrical component into the tube and dressing a portion of the lead of the electrical component along the outside of the tube; and then winding the capacitor around the tube and a dressed portion of the lead of the electrical component such that one electrode of the capacitor makes an electrical connection with the dressed portion of the lead.

14. A method according to claim 13 wherein the step of forming the lead of the electrical component comprises:

flattening the lead of the electrical component over a portion of its length; and bending the flattened portioned of the lead of the electrical component.

References Cited

UNITED STATES PATENTS

| 1,578,977 | 3/1926 | Frasse | 323—74 |
| 2,464,376 | 3/1949 | Cohen et al. | 323—74 X |
| 2,966,649 | 12/1960 | Haynman. | |
| 3,295,055 | 12/1966 | Matsushima et al. | 323—74 |

J D MILLER, Primary Examiner

A. D. PELLINEN, Assistant Examiner

U.S. Cl. X.R.

317—101, 256; 333—70